United States Patent
Banerjee et al.

(10) Patent No.: US 7,130,829 B2
(45) Date of Patent: Oct. 31, 2006

(54) DIGITAL RIGHTS MANAGEMENT

(75) Inventors: Dwip N. Banerjee, Austin, TX (US); Rabindranath Dutta, Austin, TX (US); Krishna Yellepeddy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 956 days.

(21) Appl. No.: 09/895,095

(22) Filed: Jun. 29, 2001

(65) Prior Publication Data

US 2003/0004885 A1    Jan. 2, 2003

(51) Int. Cl.
*G06Q 99/00* (2006.01)
*H04K 1/00* (2006.01)
*H04L 9/00* (2006.01)

(52) U.S. Cl. .............................. 705/51; 705/1; 705/52; 705/53; 705/54; 705/57; 705/59; 707/8; 707/9; 707/10; 709/229; 710/13; 710/74; 710/200; 711/117; 711/145; 711/163; 713/168; 713/176; 713/193; 726/1; 726/4; 726/28

(58) Field of Classification Search ................. 705/51, 705/52, 58, 59, 53, 54, 57; 380/227, 228, 380/229, 230; 707/8–10; 709/229; 710/13, 710/74, 200; 711/117, 145, 163; 713/168, 713/176, 193; 726/1, 4, 28
See application file for complete search history.

(56) References Cited

U.S. PATENT DOCUMENTS

| | | | | |
|---|---|---|---|---|
| 5,260,999 A | * | 11/1993 | Wyman | 705/59 |
| 5,671,412 A | * | 9/1997 | Christiano | 707/104.1 |
| 5,745,879 A | * | 4/1998 | Wyman | 705/1 |
| 5,892,900 A | * | 4/1999 | Ginter et al. | 713/200 |
| 6,047,242 A | * | 4/2000 | Benson | 702/35 |
| 6,272,535 B1 | * | 8/2001 | Iwamura | 709/217 |
| 6,411,941 B1 | * | 6/2002 | Mullor et al. | 705/59 |
| 6,574,612 B1 | * | 6/2003 | Baratti et al. | 705/59 |

* cited by examiner

*Primary Examiner*—Bradley B. Bayat
(74) *Attorney, Agent, or Firm*—Duke W. Yee; Jeffrey S. LaBaw; Wing Yan Mok

(57) ABSTRACT

A method, program, and system for augmenting digital rights management are provided. The invention comprises associating two fields with an electronic document. The first field identifies the current owner of the electronic document, and the second field contains information about previous ownership of the electronic document. If ownership of the electronic document is transferred from the current owner to a subsequent owner, the current owner's name in the first field is replaced with the subsequent owner's name. In addition, information about the subsequent owner is added to the ownership history field.

35 Claims, 4 Drawing Sheets

DIGITAL RIGHTS MANAGEMENT

BACKGROUND OF THE INVENTION

1. Technical Field

The present invention relates to access to electronic resources, and more specifically to the transfer of access rights.

2. Description of Related Art

Digital Rights Management (DRM) is a system for protecting the copyrights of digital content that is distributed online. Examples of such digital content includes e-books, music, and movies. DRM systems are an important element in safeguarding against unauthorized access and use of digital properties. DRM systems often use the technique of secure distribution, where users need custom software to access content. This software implements the rights management properties. Typically, the content generator sets up rules for access during packaging for distribution. The software verifies that the rights information associated with the content being accessed is being respected. The rights information associated with the content typically contains the manufacturer information. It is the cornerstone of the rights enforcement mechanism.

DRM is an important aspect of conducting business on the Internet. It prevents unauthorized distribution and usage of content. Typically, digital rights are managed through two mechanisms: secure distribution, where the user has to install custom software to access content, and digital watermarking, where the manufacturer takes the responsibility of verifying proper usage by using watermark identity spiders. Such mechanisms help manufacturers to regulate and monitor the access of digital properties.

However, none of the solutions address the issue of transferring of digital rights from one owner to another, either permanently or temporarily. It is a common practice in the real world for property owners to sell their properties to others. Such an act legally transfers the ownership to another party. Currently, there is no mechanism to accomplish the same task for digital properties over the Internet.

In addition, there is no current method for maintaining a record of ownership information. Current ownership, as well as the chain of ownership, can provide important information. For example, this information can be of use both financially (for manufactures) and legally (in case of disputes, as well as for transfer of digital properties).

When a customer purchases a product, that customer also purchases a set of property rights, such as the right to lend and resell. Different rights "packages" might be sold to a customer, which would dictate which rights that customer could transfer. By the same token, this set of rights would also be inherited by subsequent transferees of the property. However, there is no current method for specifying DRM selling and lending privileges and the inheritance of these privileges.

Therefore, it would be desirable to have a method and mechanism for transferring digital property rights and maintaining records of chains of title. It would also be desirable to have a method for specifying selling and lending privileges for digital properties and the inheritance of such privileges.

SUMMARY OF THE INVENTION

The present invention provides a method, program, and system for augmenting digital rights management. The invention comprises associating two fields with an electronic document. The first field identifies the current owner of the electronic document, and the second field contains information about previous ownership of the electronic document. If ownership of the electronic document is transferred from the current owner to a subsequent owner, the current owner's name in the first field is replaced with the subsequent owner's name. In addition, information about the subsequent owner is added to the ownership history field.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
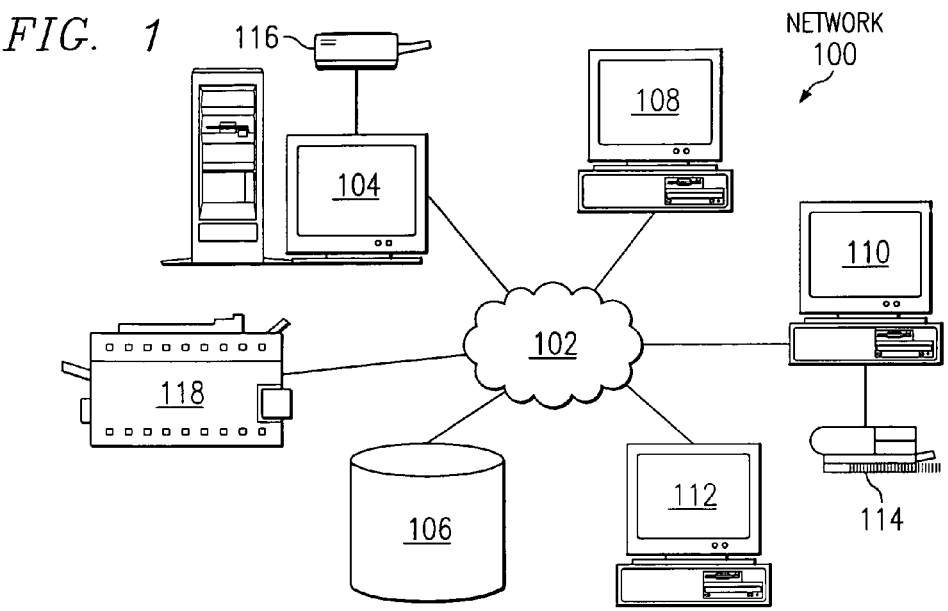
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
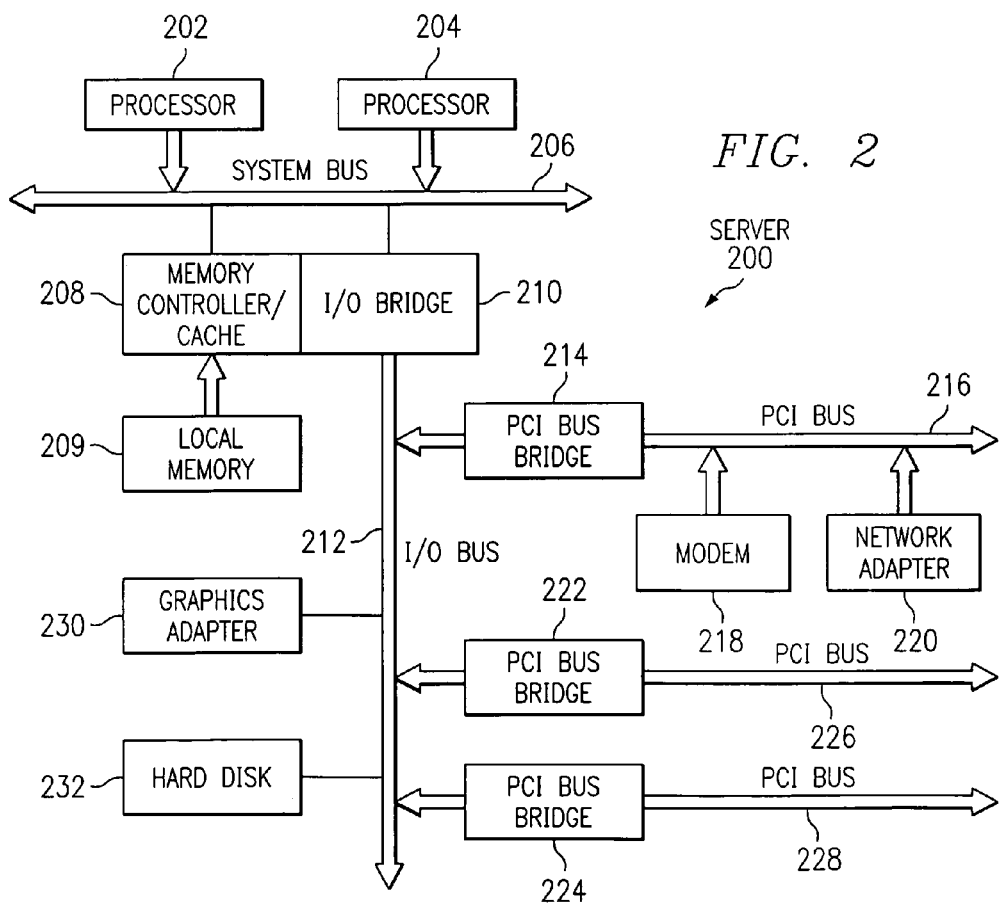
FIG. 2 depicts a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an eSeries pServer system, a product of International Business Machines Corporation in Armonk, N.Y., running the Advanced Interactive Executive (AIX) or Linux operating systems.

Figure 3:
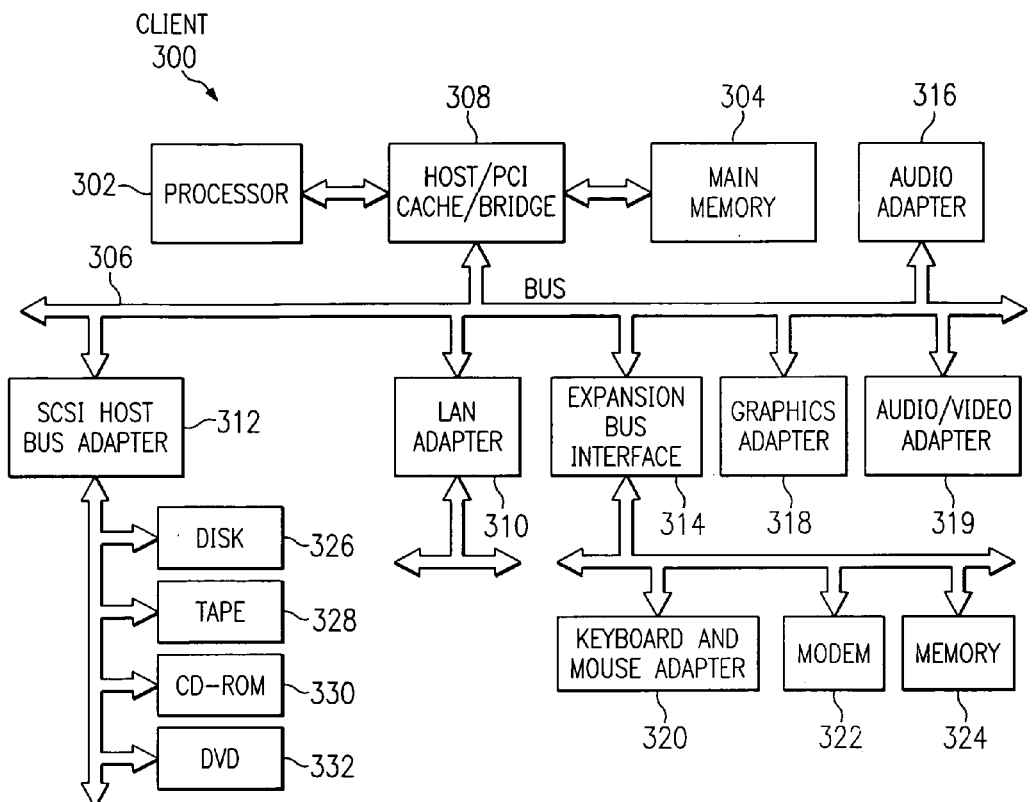
FIG. 3 depicts a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, CD-ROM drive 330, and DVD drive 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

DRM systems enforce a set of rules set up by the publisher when packaging digital property for distribution. To access content, the user must have special software that can interpret the business rules. Once the access is authenticated, the user is allowed to use the content based on the rights agreement in force (i.e. the software manages access after verifying that the user has satisfied all requirements for access).

Figure 4:
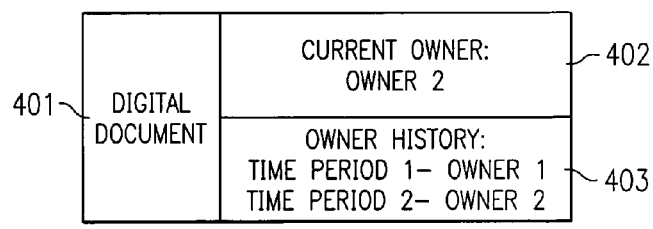
FIG. 4 depicts a diagram illustrating ownership information associated with digital property in accordance with the present invention.

Referring to FIG. 4, a diagram illustrating ownership information associated with digital property is depicted in accordance with the present invention. In the present invention, digital rights information 401 is augmented with two fields. Current owner 402 refers to the party that currently owns the rights to the digital property in question. This information can be used in rights enforcement (i.e. only the current owner can use the property) and also to legally transfer the property among parties. Ownership history 403 is a list of prior owners. This can provide valuable information to the manufacturer (about potential customers for other products) and can also be useful in case of disputes.

Access control software can check these variables to ensure that digital rights are being respected and can send back information to the manufacturer in case of abuse or violation.

Figure 5:
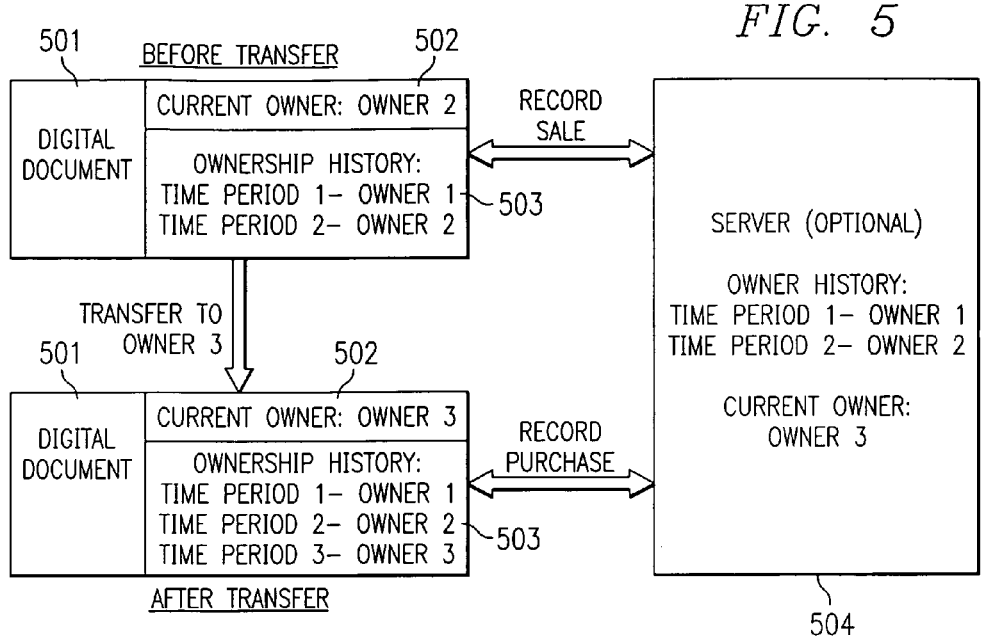
FIG. 5 depicts a diagram illustrating the transfer of digital property and the update of ownership information in accordance with the present invention.

Referring now to FIG. 5, a diagram illustrating the transfer of digital property and the update of ownership information is depicted in accordance with the present invention. In the present example, before being transferred, the property (digital document) 501 is registered to Owner 2. This is indicated in the current owner field 502. The ownership history field 503 shows that before property 501 was owned by Owner 2, it was first owned by Owner 1. When property 501 is transferred (i.e. sold or loaned) to Owner 3, the current owner field 502 is updated to reflect that the fact that Owner 3 now owns property 501. In addition, the ownership history field 503 is also updated to include Owner 3.

Optionally, the specifics of the transaction may also be stored in a backup server 504. Backup server 504 contains a copy of the information stored in ownership history field 503 and current owner field 502. When property 501 is transferred from Owner 2 to Owner 3, the transaction is recorded in server 504, and the information in server 504 is updated to reflect the new information entered in fields 502 and 503.

Figure 6:
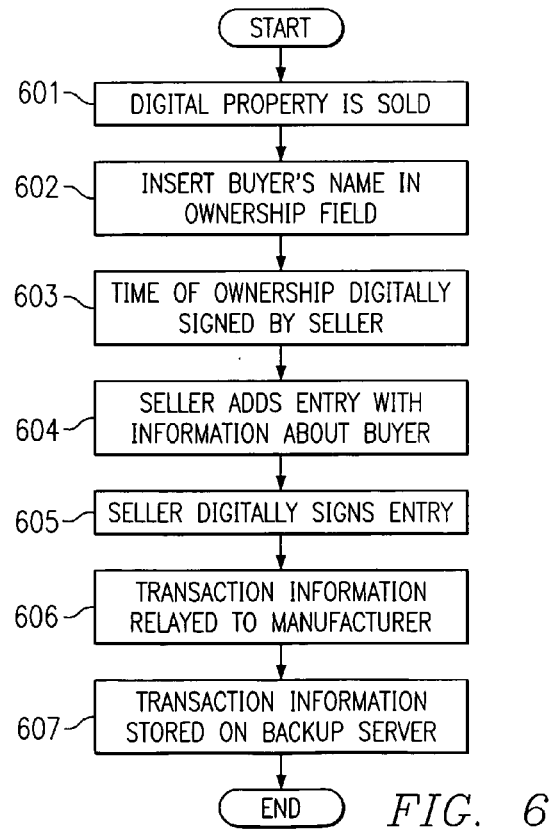
FIG. 6 depicts a flowchart illustrating an overview of the augmented DRM in accordance with the present invention.

Referring to FIG. 6, a flowchart illustrating an overview of the augmented DRM is depicted in accordance with the present invention. When digital property is first sold (step 601), the DRM inserts the buyer's name in the ownership field (step 602). In the ownership history, the time period of ownership for each owner is digitally signed by that owner (seller) (step 603). Thereafter, for every use of the product, the software validates that the invoker has ownership rights, and then allows access. When the ownership is transferred, the seller adds an entry with information about the future owner (buyer) (step 604). The seller then digitally signs this entry (step 605). This process is analogous to title transfer in tangible property and endorsement of commercial paper. The buyer (new owner) is then free to use the digital property. As an alternative, the current owner can set an ownership password field to a mutually agreed value, and thereafter, the new owner can set the field to his or her choice. In most cases, the title would be saved with the digital property itself, which would reduce the record keeping complication of storing the title and property separately.

All authentication and validation by the special software can be performed using digital signatures and certificates, as well as other well known techniques.

Optionally, the above information may be relayed back to the original manufacturer, so that the manufacturer can maintain a record of ownership history (step 606). The original manufacturer may charge a transaction fee for each transfer of ownership (if part of the contract).

As mentioned in relation to FIG. 5, a server may also store the associated information as an additional safeguard against tampering (step 607).

The present invention can also be used to allow lending of digital content (property) for limited periods of time.

Figure 7:
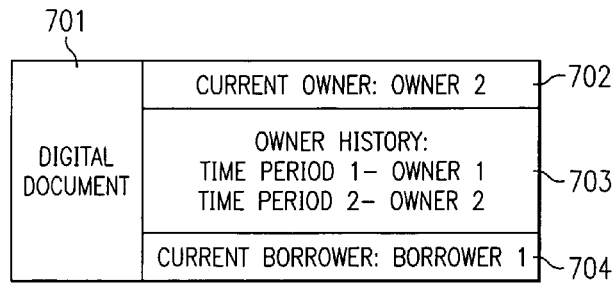
FIG. 7 depicts a diagram illustrating lending information associated with digital property in accordance with the present invention.

Referring to FIG. 7, a diagram illustrating lending information associated with digital property is depicted in accordance with the present invention. As in FIG. 4, the digital property information 701 is augmented with a current owner field 702 and an ownership history field 703. In addition, a current borrower field 704 in added. In addition to identifying the borrower, the field 704 may also indicate the time period of the loan (not shown). Borrower field 704 may contain several names if the lender is able to lend property 701 to multiple borrowers (e.g. electronic libraries).

Figure 8:
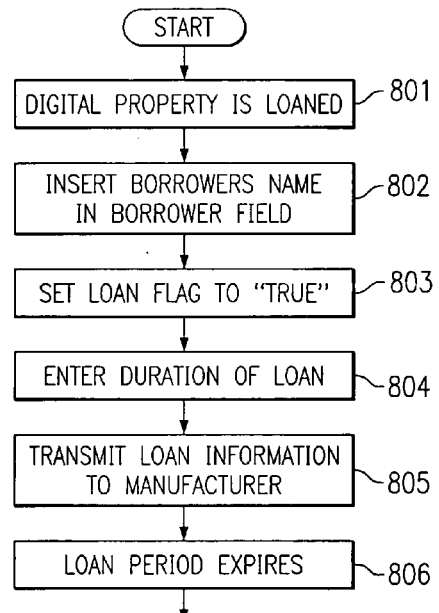
FIG. 8 depicts a flowchart illustrating DRM loans in accordance with the present invention.

Referring now to FIG. 8, a flowchart illustrating DRM loans is depicted in accordance with the present invention. The process is similar to that in FIG. 6. When the current owner has loaned the property (step 801), the owner will add an entry with the information about the borrower into the current borrower field (step 802). To support lending, a loan flag is set to "true" (step 803), and the time period specifying the duration of the loan is entered (step 804). Optionally, the manufacturer may also be notified of the loan (step 805). After the loan period expires (step 806), the access control software no longer permits the borrower to access the content.

The process flows depicted in FIGS. 6 and 8 are dependent upon the rights and privileges of the owner of the digital property in question. Another aspect of the present invention is the ability to specify and control the types of transfer rights the owner of digital property possesses, and how those specified rights are inherited by subsequent transferees of the property.

Figure 9:
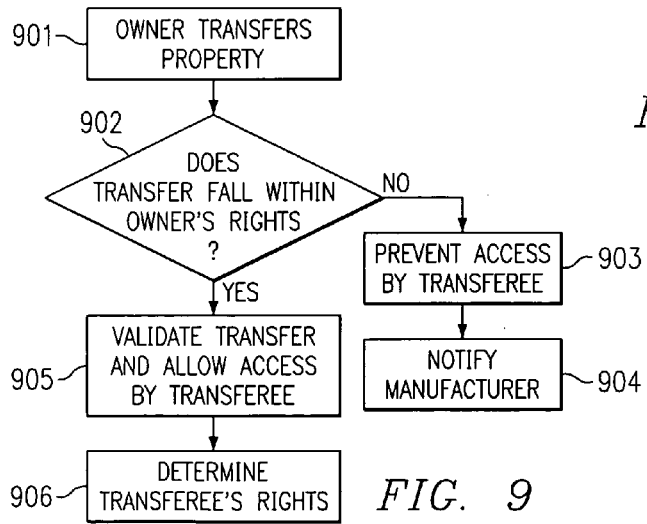
FIG. 9 depicts a flowchart illustrating the process of verifying transfer rights in accordance with the present invention.

Referring to FIG. 9, a flowchart illustrating the process of verifying transfer rights is depicted in accordance with the present invention. In addition to the owner information and ownership history, the rights information associated with digital property is augmented with the following transfer rights:

Lending information: This record provides answers to the questions: Does this owner have the privilege of lending this property? Can the owner lend to multiple people simultaneously, and if so, to how many? (For example, simultaneous lending might be used by a library.) Will the owner be allowed to use the property while it is out on loan?

Reselling information: Information on the privilege to resell (e.g. allow reselling to only one person, if the original owner is an individual).

Media players or platforms on which the content is playable: The merchant or manufacturer may wish to restrict the digital properties to be playable on certain target devices.

When the owner of digital property transfers (i.e. Sells or loans) that property (step 901), the access control software can check the owner's transfer rights to ensure that digital rights are being respected (step 902). If the attempted transfer does not fall within the owner's transfer rights, the access control software will not validate the transfer and will prevent the transferee's access to the digital content (step 903). In addition, the access control hardware will send back information to the manufacturer in case of abuse or violation (step 904). If the attempted transfer does fall within the owner's transfer rights, the access control software will validate the transfer of the digital property based on the privileges that the owner has, and allow the transferee to access the digital content (step 905).

The access control software may also determine the transferee's rights, according to the rights of the transferor and the nature of the transfer (step 906). There are various cases to be considered for the inheritance of privileges, with rights inheritance often dependent upon the classification of the original owner. For example, a borrower typically will have no privileges other than to view or listen to the digital property.

A merchant or manufacturer may set up a price schedule based on the privileges that the user desires. For example, a user who will not be lending or reselling the material may get a deep discount for the digital property. Where the original owner is an individual (as opposed to a retailer), a purchaser of the digital property will usually inherit the same privileges that the original owner had. In the case of a retailer (who has the right to resell to multiple customers), individual buyers only inherit a subset of the retailer's privileges (i.e. view or listen, but not resell).

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of augmenting digital rights management, the method comprising:
    associating a first field with an electronic property, wherein the first field identifies a current owner of the electronic property; and
    associating a second field with the electronic property, wherein the second field includes a list of owners having an order according to a historical order of transfer of rights to the electronic property between a plurality of previous owners; and
    wherein access control software allows access to the electronic property only upon verification that a user satisfies specified requirements for access, and wherein the specified requirements include the user being listed as the current owner in the first field.

2. The method according to claim 1, wherein the access control software restricts use of the electronic property to the person identified as the current owner.

3. The method according to claim 1, further comprising notifying the electronic property's manufacturer in case of property rights violations.

4. The method according to claim 1, further comprising:
    if ownership of the electronic property is transferred from the current owner to a subsequent owner;
    in the first field, replacing the current owner's name with the subsequent owner's name; and
    in the second field, appending an entry with information about the subsequent owner, wherein the information about the subsequent owner includes a time period of ownership for the subsequent owner.

5. The method according to claim 4, further comprising allowing access to the electronic property by the subsequent owner only after the current owner has electronically signed an entry in the second field identifying the subsequent owner.

6. The method according to claim 4, further comprising storing the information associated with the ownership transfer in a backup server.

7. The method according to claim 4, further comprising sending notice of the transfer of ownership to the electronic property's manufacturer.

8. The method according to claim 4, wherein the subsequent owner inherits the same access privileges as the current owner.

9. The method according to claim 1, further comprising:
    if use of the electronic property is temporarily loaned by the current owner to a borrower;
    associating a third field with the electronic property, wherein the third field identifies the current borrower of the electronic property and designates the duration of the time period of the loan; and
    wherein access control software allows borrower access to the electronic property only during the duration of the loan period.

10. The method according to claim 9, wherein access control hardware restricts access to the electronic property to the person identified as borrower.

11. The method according to claim 9, wherein the current owner cannot access the electronic property during the duration of the loan period.

12. The method according to claim 9, further comprising storing the information about the loan in a backup server.

13. The method according to claim 9, wherein the current owner may simultaneously loan the electronic property to multiple borrowers.

14. The method according to claim 9, further comprising sending notice of the loan to the electronic property's manufacturer.

15. The method according to claim 9, wherein the borrower acquires a specified portion of the owner's access privileges.

16. The method according to claim 1, wherein the property title is stored in the same file with the electronic property itself.

17. A computer program product in a computer readable medium for use in a data processing system, for augmenting digital rights management, the computer program product comprising:
    instructions for associating a first field with an electronic property, wherein the first field identifies a current owner of the electronic property; and
    instructions for associating a second field with the electronic property, wherein the second field includes a list of owners having an order according to a historical order of transfer of rights to the electronic property between a plurality of previous owners; and
    wherein access control software allows access to the electronic property only upon verification that a user satisfies specified requirements for access, and wherein the specified requirements include the user being listed as the current owner in the first field.

18. The computer program product according to claim 17, wherein the access control software restricts use of the electronic property to the person identified as the current owner.

19. The computer program product according to claim 17, further comprising instructions for notifying the electronic property's manufacturer in case of property rights violations.

20. The computer program product according to claim 17, further comprising:
- if ownership of the electronic document is transferred from the current owner to a subsequent owner;
- instructions for replacing the current owner's name with he subsequent owner's name in the first field; and
- instructions for appending an entry with information about the subsequent owner in the second field, wherein the information about the subsequent owner includes a time period of ownership for the subsequent owner.

21. The computer program product according to claim 20, further comprising instructions for allowing access to the electronic property by the subsequent owner only after the current owner has electronically signed an entry identifying the subsequent owner in the second field.

22. The computer program product according to claim 20, further comprising instructions for storing the information associated with the ownership transfer in a backup server.

23. The computer program product according to claim 20, further comprising instructions for sending notice of the transfer of ownership to the electronic property's manufacturer.

24. The computer program product according to claim 20, wherein the subsequent owner inherits the same access privileges as the current owner.

25. The computer program product according to claim 17, further comprising:
- if use of the electronic property is temporarily loaned by the current owner to a borrower;
- instructions for associating a third field with the electronic property, wherein the third field identifies the current borrower of the electronic property and designates the duration of the time period of the loan; and
- wherein access control software allows borrower access to the electronic property only during the duration of the loan period.

26. The computer program product according to claim 25, wherein access control hardware restricts access to the electronic property to the person identified as borrower.

27. The computer program product according to claim 25, wherein the current owner cannot access the electronic property during the duration of the loan period.

28. The computer program product according to claim 25, further comprising instructions for storing the information about the loan in a backup server.

29. The computer program product according to claim 25, wherein the current owner may simultaneously loan the electronic property to multiple borrowers.

30. The computer program product according to claim 25, further comprising instructions for sending notice of the loan to the electronic property's manufacturer.

31. The computer program product according to claim 25, wherein the borrower acquires a specified portion of the owner's access privileges.

32. The computer program product according to claim 17, wherein the property title is stored in the same file with the electronic property itself.

33. A system for augmenting digital rights management, the method comprising:
- a first register which associates a first field with an electronic property, wherein the first field identifies a current owner of the electronic document;
- a second register which associates a second field with the electronic property, wherein the second field includes a list of owners having an order according to a historical order of transfer of rights to the electronic property between a plurality of previous owners; and
- wherein access control software allows access to the electronic property only upon verification that a user satisfies specified requirements for access, wherein the specified requirements include the user being the current owner in the first field.

34. The system according to claim 33, further comprising:
- if ownership of the electronic document is transferred from the cur-cut owner to a subsequent owner;
- a first updating component which replaces the current owner's name with the subsequent owner's name in the first field; and
- a second updating component which appends an entry with information about the subsequent owner in the second field, wherein the information about the subsequent owner includes a time period of ownership for the subsequent owner.

35. The system according to claim 33, further comprising:
- if use of the electronic document is temporarily loaned by the current owner to a borrower;
- a third register which associates a third field with the electronic property, wherein the third field identifies the current borrower of the electronic property and designates the duration of the time period of the loan; and
- wherein access control software allows borrower access to the electronic property only during the duration of the loan period.

* * * * *